United States Patent
Bhide

(10) Patent No.: US 9,661,713 B2
(45) Date of Patent: May 23, 2017

(54) INTELLIGENT LED BULB AND VENT METHOD, APPARATUS AND SYSTEM

(71) Applicant: Intel Corporation, Santa Clara, CA (US)

(72) Inventor: Sandhiprakash J. Bhide, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/962,669

(22) Filed: Dec. 8, 2015

(65) Prior Publication Data

US 2016/0255697 A1    Sep. 1, 2016

Related U.S. Application Data

(60) Provisional application No. 62/121,100, filed on Feb. 26, 2015, provisional application No. 62/121,103, filed on Feb. 26, 2015.

(51) Int. Cl.
*F21V 21/00* (2006.01)
*H05B 33/08* (2006.01)
(Continued)

(52) U.S. Cl.
CPC ......... *H05B 33/0854* (2013.01); *F21K 9/232* (2016.08); *F21V 23/045* (2013.01);
(Continued)

(58) Field of Classification Search
CPC ........... H05B 33/0815; H05B 33/0818; H05B 41/2828; H05B 41/3921; H05B 41/3927
(Continued)

(56) References Cited

U.S. PATENT DOCUMENTS 5,063,833 A    11/1991  Hara et al.
6,459,919 B1 *  10/2002  Lys ..................... A61N 5/0616
                                             315/291
(Continued)

FOREIGN PATENT DOCUMENTS

EP         1643324 A2   4/2006
WO     WO2014-124159 A2   8/2014

OTHER PUBLICATIONS

International Search Report and Written Opinion mailed May 12, 2016 for International Application No. PCT/US2016/014137, 18 pages.

*Primary Examiner* — Minh D A
(74) *Attorney, Agent, or Firm* — Schwabe, Williamson & Wyatt, P.C.

(57) ABSTRACT

Apparatuses, methods and storage medium associated with an intelligent LED light apparatus are disclosed herein. In embodiments, an intelligent LED light apparatus may include a communication interface, a processor, a body that encases at least the communication interface and the processor, and a plurality of sensors of a plurality of sensor types disposed on the body. The processor may be configured to receive sensor data from the sensors, and transmit the sensor data or results from processing the sensor data to an external recipient. Further, for some embodiments, the intelligent LED bulb apparatus may further comprise LED lights, and the body further encases the LED lights. In other embodiments, the body may include a male connector to mate with a bulb receptor, and a female connector to mate with a LED bulb. Other embodiments may be disclosed or claimed.

25 Claims, 10 Drawing Sheets

(51) Int. Cl.
*H02J 9/06* (2006.01)
*H05B 37/02* (2006.01)
*F21V 23/04* (2006.01)
*F21K 9/232* (2016.01)
*F21Y 115/10* (2016.01)

(52) U.S. Cl.
CPC ............ *F21V 23/0442* (2013.01); *H02J 9/06* (2013.01); *H05B 33/0872* (2013.01); *H05B 37/0272* (2013.01); *F21Y 2115/10* (2016.08); *Y02B 20/48* (2013.01)

(58) Field of Classification Search
USPC ....... 315/291, 34, 185 R, 200 R, 209 R, 307
See application file for complete search history.

(56) References Cited

U.S. PATENT DOCUMENTS

| | | |
|---|---|---|
| 2005/0125102 A1 | 6/2005 | Nichols et al. |
| 2006/0285325 A1* | 12/2006 | Ducharme ......... H05B 33/0857 362/231 |
| 2008/0001551 A1* | 1/2008 | Abbondanzio ..... A01M 1/2077 315/291 |
| 2008/0015740 A1 | 1/2008 | Ossan, Jr. |
| 2010/0141153 A1 | 6/2010 | Recker et al. |
| 2013/0063042 A1* | 3/2013 | Bora .................. H05B 33/0863 315/292 |
| 2014/0252958 A1* | 9/2014 | Subotnick .......... H05B 37/0218 315/149 |

* cited by examiner

INTELLIGENT LED BULB AND VENT METHOD, APPARATUS AND SYSTEM

This application is a non-provisional application of provisional applications 62/121,100 and 62/121,103, respectively entitled "Intelligent Vent Method and Apparatus" and "Intelligent LED Bulb Method and Apparatus," both filed on Feb. 26, 2015, and claims priority to the 62/121,100 and 62/121,103 provisional applications, which specifications are hereby fully incorporated by reference.

TECHNICAL FIELD

The present disclosure relates to the fields of lighting and sensing technology, as well as heating, ventilation and air conditioning (HVAC) technology, in particular, to apparatuses, methods and storage medium associated with an intelligent (Light Emitting Diode) LED bulb and/or adapter, or vent.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cities: Many cities are interested in understanding and developing insight into micro-climates (e.g. temperature, humidity, barometric pressure), pollution levels (e.g. noise, CO, SOx, NOx, particulate matter, Ozone, HC, UVA/B and other pollutants), vehicular congestion on the roads, where potholes are, where crimes is in progress, where there is meth activity, likely terrorist activity, where non-working lights are, where bus routes can be optimized, how to communicate with citizens of impending disasters (e.g. chemical spills, tsunami, earthquake, criminal on the loose, wild animal in the neighborhood), how to improve city resiliency, security and flexibility in case of disasters, and how to improve city to provide citizen communication, how to reduce the carbon footprint, how to manage parking spaces, provide automatic/accurate charging/advance parking, how to optimize trucks movement in the city, how to detect when and where gun shots might have been fired, understand where an explosion might have taken place, understand the city areas where there is no human activity or traffic, understand when dangerous animals such mountain lions, coyotes, bears might have entered the urban boundary, and/or where garbage dumps might be overflowing, to name a few.

Utilities: Many utilities are interested in reducing the labor cost of reading water, gas, and electric meters, and improve the accuracy, how to sense outages, how to sense the overall needs and patterns of the neighborhoods, how to provide economic and yet fast internet access to all its citizens. The utilities might be interested in knowing how the electrical load varies during the day for individual dwelling or a neighborhood. Utilities might also be interested in optimal management of maintenance and service calls and routes to maximize efficiency.

Homes: Many home owners are interested in providing security to the family members, where there are window or door break-ins by burglars, to provide alerts when aged people are in trouble, turn home lights On/Off depending on given criteria (when a person is not in the room, turning lights randomly On/Off when the family is out of home), monitor entry at the front door, allowing access and monitoring specific people coming in and out, e.g. cleaners, Sears repairman), how to ensure room comfort (temperature, humidity), how to safe environment (e.g. CO, LPG, children safety), how to improve the efficiency, reduce cost, reduce energy consumption of the home utilities, how to handle emergencies. Home owners are also interested in monitoring the drop-offs at the front door and making sure the goods left by the courier services at the front door are not stolen and at least detected, when there is smoke in the room, monitoring family members, e.g. baby monitoring.

Offices: Many commercial property owners are interested in improving their efficiency, reduce cost, reduce energy consumption, and reduce the carbon footprint, how to improve security, how to detect room occupancy, how to ensure conference room comfort, how to provide indoor location and direction, how to ensure optimal lighting conditions for occupants, how to provide balanced lighting between on natural light in the room coming through the windows and room light. Office spaces may also be interested in ensuring room comfort (temperature and humidity).

Public places: Many mall, stadium, airport et al operators are interested in ensuring security, detecting impending disasters and public safety, preventing stealing and vandalism, and detecting non-working lights. Similarly, many educational institutions are interested in preventing vandalism, student assaults, and dangerous situations, providing ubiquitous internet access, and detecting overflowing garbage areas. Many retailers are interested in preventing theft, monitoring empty/low supplies, understanding customer preferences, reducing energy consumption, maintaining temperature control, and realizing heavy traffic areas. City officials and government agencies might be interested in learning beforehand any suspicious activity.

Industrial/Agricultural: Many industrial property management are interested in detecting dangerous gases, ensure worker safety, preventing theft, ensuring adequate lighting and comfort, reducing energy consumption, maintaining temperature control, and optimizing good routes within the factory. Many agricultural operators have similar interest.

Increasingly, they all use LED bulbs.

Further, in most homes and offices, every room or an area there are one or two vents that blow air in specific direction. These vents can be in the floor, in the ceiling, or in the side wall. The direction in which the air blows is generally decided by the register cover at the end of the vent. It is fixed based on how the register is stamped. In some cases, in addition to the register cover, right under or behind the register cover, there are one or more fins that can be mechanically adjusted or rotated with a lever to either open or close the vent or change the direction of the air flow or shut-off the air flow. As a result of this fixed configuration, some rooms are either too hot or too cold. Also in some cases, people sitting in different parts of the same room may feel either too hot or too cold. Most dwellings or offices or other areas have only one thermostat or maybe two. Additionally, in most homes the thermostat(s) and the vents are far apart to able to closely correlated to each other and establish a good feedback control system. And most HVAC systems are central. Since vents are mechanical/fixed with a lever that allows the vents to be manually controlled fully closed/open or in between, there is neither any control of the direction of the air flow, nor the amount of air that is blown in a given room. Individual rooms in the home are also not tuned to specific comfort needs of the individual residing in that room.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
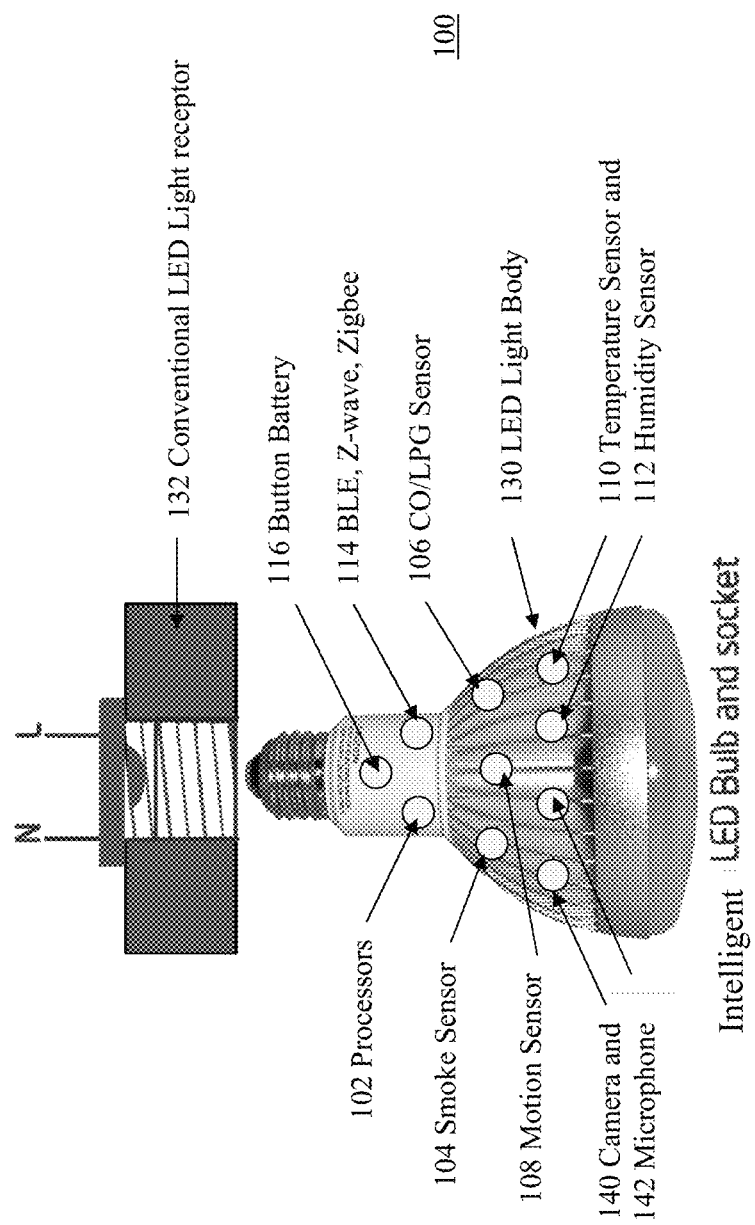
FIG. 1 illustrates a perspective view of the intelligent LED bulb of the present disclosure, in accordance with various embodiments.

Apparatuses, methods and storage medium associated with an intelligent LED light apparatus are disclosed herein. In embodiments, an intelligent LED light apparatus may include a communication interface, a processor, a body that encases at least the communication interface and the processor, and a plurality of sensors of a plurality of sensor types disposed on the body. The processor may be configured to receive sensor data from the sensors, and transmit the sensor data or results from processing the sensor data to an external recipient. Additionally, for some embodiments, the intelligent LED bulb apparatus may further comprise LED lights, and the body further encases the LED lights. In other embodiments, the body may include a male connector to mate with a bulb receptor, and a female connector to mate with a LED bulb.

In embodiments, the sensors may include smoke, CO, LPG, motion, temperature, humidity and other sensors. Example of other sensors may include camera and microphone. These can be changed, added, and substituted with other sensors that are relevant to the environment. The communication interface may comprise Bluetooth® Low Energy (BLE), Z-Wave, ZigBee or any other protocol which is a low power, small overhead protocol for communicating with proximately located external controller, or other intelligent LED light bulbs near vicinity, an intelligent sensor hub or with an actuator. Other embodiments may include longer range communication interface, such as WiFi, Bluetooth®, 3G/4G and Long Term Evolution (LTE). Each unit may have Internet Protocol IPV4 or IPV6 address to communicate in accordance with the (Transmission Control Protocol) TCP/IP.

In embodiments, a small transformer may be provided to convert 110/120V to 3.3V or 5V DC or both depending on the processor, communication interfaces, and sensors. Additionally, there may be a cell battery that allows sensing, processing and/or transmission/receipt, even when the electricity is off for a short duration.

In other words, there are several different exemplary implementations or instantiations of the intelligent LED bulb apparatus, including different form factors, included in this disclosure.

1. The implementation of an intelligent LED Bulb that may generally screw in a socket which may be used in homes, offices, airports, schools, educational buildings, retail, industrial, stadiums and so on.
2. Implementation of the LED luminaire that may be used in lighting the city streetlights, parks, tunnels, neighborhood, outside in the airports, parking lots and other places where the location of the light source is 20 to may be a 100' high on a pole or top of a building.
3. Office and industrial space where the functionality may be implemented in the same housing where fluorescent tube lights were used in the past. This form factor may implement an intelligent LED tube light. Same functionality may be implemented in other form factors such square, round, oval including bendable LED light strip.
4. For a group of people who have either bought a LED bulb already or people who do not want the intelligence implemented in the LED bulb itself, the same intelligence can be provided using an extension/adapter socket (which may be disc shaped) which has both the male and female connectors. The male connector may go into an existing socket and then LED bulb that has already been bought may go into the female connector of the extension socket. The socket has the same functionality minus the LEDs and LED electronics that would be in the full intelligent LED bulb described above in 1.

From the description to follow, it will be noted that several aspects of the intelligent LED bulb apparatus of the present disclosure are unique/novel.

1. It is a general purpose compute, sensing, analytics, and communication platform which happens to have LED light housing. This is different than others who have solutions that are embedded in the light platform to monitor and control the LED light and may be few other sensors and a micro-controller. The intelligent LED bulb apparatus not only uses the microcontroller functionality but is also a full-fledged compute platform so it can perform may functions that require deep computing capability, e.g. video or audio analytics.
2. This platform, in embodiments, does not contain just few sensors and WiFi or Bluetooth® like in other implementations so that an external device like a tablet or a smartphone can control this. This platform, in embodiments, has sensors, processing, communication and analytics so this device can run as a feedback control system completely of its own based on the profile stored in the device or as the unit learns along the way.
3. The scope of intelligent LED bulb apparatus expands beyond providing light control but extends into:
   a. HVAC control using LED Light as a platform but not using LED Lights. The LED bulb can detect temperature and humidity in every room thus creating not one or two thermostats in the house but one or more for every room in the house.
   b. The intelligent LED bulb apparatus may function as a general purpose compute platform that can do most of the management of that room. For example, the light bulb platform can replace the function of baby monitor.
   c. The analytics can detect when the baby is up or crying or simply playing.
   d. The analytic can detect whether an elderly person has fallen on the ground and cannot get up and reach a phone. The person is then simple able to talk to the phone to make a phone call to the emergency service to get help. As such as the platform can perform automatic speech recognition and initiate a command for action.
   e. The intelligent LED bulb apparatus can replace the function of the CO monitor. Normally there is one CO monitor per home. This allows CO monitor to be placed in every room.
   f. The intelligent LED bulb apparatus can detect smoke in every room. The intelligent LED bulb apparatus may also initiate a buzzer function to communicate the presence of smoke. A buzzer or a speaker may be part of the intelligent LED bulb.
   g. This intelligent LED bulb apparatus can detect entry of an unauthorized person in the home using video and images captured by the intelligent LED bulb or by a passive infrared sensors when it is known that no one is expected to be at home. The audio analytics can detect a window-glass break-in using a standard template of sound of a typical window-breakage.
   h. The intelligent LED bulb apparatus can provide security function. If an external repair agency, e.g. "Sears" repairman was to come to home for repairs, the presence of camera in each light in each room will allow a remote homeowner working at a remote office to monitor, record or stream video from each home. The homeowner may be able to draw quick boundaries around the area where the repairman should be limited to and which areas are off-limits. This may allow the homeowner to not have to continuously monitor the repairman in the home but only the boundaries are violated.
   i. The intelligent LED bulb apparatus can provide early warning. The LED lights generally do not die instantly like an incandescent lamp but rather the luminance starts reducing over time towards the end of its life. The intelligent LED bulb apparatus can itself communicate the owner that it is dying so the LED bulb can be replaced. This is only a small subset of the usages it can enable.
4. The scope of the external luminaire expands beyond providing light control as others do but may extend into:
   a. Providing turning lights on/off, increased or decrease brightness not just based on the detection of a movement under the luminaire but also recognizing the type of object. For example, the camera coupled with a compute and analytics engine in the luminaire can distinguish between a human being, a stray dog or cat, or a fast moving car, or a big animal like to bear, mountain lion, coyote, or a large game animal and appropriately take an action that is consistent with the type of object being seen. The processing is occurring right in the luminaire without needing to go the cloud except some statistical updates which are uploaded.
   b. Parking Management can be done using the intelligent LED luminaire which would include "looking" for empty parking places, occupancy, direction of travel, speeding violations, abandoned cars, parking violations, smoke detection, suspicious activity, etc. by creating a seamless view of the entire parking lot by combining views from each pole into one common parking view. The analytics of the parking runs in each of the intelligent LED luminaire. The parking and ticketing can also be done when the camera in the luminaire sees a car coming and occupying a parking space, until it leaves and then the analytics can figure out how long the car was in that spot and charge the owner appropriately for the duration.
   c. The range of the intelligent luminaires can form a mesh so that they cooperate and work together. For example, if one of the streetlight hears a gun shot, other streetlights in the area can help triangulate the location of the gun shot and start video recording locally as well as video streaming and storage in the cloud for post-analysis. The individual pole can also call the emergency services without going to the cloud.
   d. The intelligent luminaire can detect potholes, can detect car congestions thereby helping the city in creating alternate pathways for vehicles to avoid congestion and delays. The luminaire can also do the same function by re-routing the traffic based on pollution level of a certain area of the city.
   e. The video analytics running can do scene analysis to detect suspicious activities or a terrorist activity thereby alerting the key disaster response team into action instantly.
   f. The large number of sensors housed in the intelligent LED luminaire apparatus such as Smoke/Odor, NOx, HC, $CO/CO_2$, Radiation/Radon, UVA/B, Chemical Spills, Meth, Particulate Matter, Garbage, and other organic compounds, and other pollutants can together help create a map of a city literally every minute or even faster by sensing, making sense and updating the cloud using analytics running locally in the luminaire.
   g. Environment sensors such as Ambient Light, Power Monitoring, Digital signs, Ultrasound, Motion, Real Time Location Systems, Audio/Video can help create a range of application that allow monitoring of energy usage, criminal activity, suspicious activity and so on.
   h. The intelligent LED luminaire apparatus may also work as a micro-weather station because it has Temperature, Humidity, Rainfall, Wind, Seismic, Pressure, and UVA/UVB. This information will be useful to the local neighborhood as well monitoring key parameters in the city.
   i. The intelligent LED luminaire apparatus can communicate with city's smart meters for water, gas, and electricity over ZigBee, Z-Wave, or any other communication method to read meters automatically thereby completely eliminating truck rolls and travels by the utility personnel through neighborhoods.
j. Capabilities that are different in this intelligent LED luminaire apparatus that are not in any other luminaire include, but are not limited to:
   i. Power line as an Ethernet backhaul+WiFi, Bluetooth® (BT), 3/4/xG, Zigbee, Z-Wave . . .
   ii. Pole-to-Pole Mesh Network+hand-off similar to cell towers
   iii. Bi-directional high bandwidth (BW), optical communication between the poles/cars/people using low power lasers that are locked for example, on a car when it comes view, forms a sustained channel during the duration the car is under the pole and using that as a communication channel for transporting data back and forth between the streetlight and the car, or humans, and even animals tagged with sensors. The luminaire can also connect with other luminaires ahead on the road and communicate them of an impending congestion.
   iv. Femto/Pico cell capability allowing the communication companies to deliver both data and voice bandwidth by housing a femto/pico cell capability integral to the intelligent LED luminaire and fed by coaxial or optical cable or any other wired or wireless methods.
   v. Energy Neutral Operation (solar cells)—with installation of an energy harvesting mechanism such as a PV solar cell to power the intelligent unit making it energy neutral.
   vi. Indoor/outdoor location through triangulation—using the WiFi, BT or any other communication as a beacon for triangulating internal as well as external navigation.
   vii. Optical communication through LED light intensity or amplitude modulation—the LED light can pulsated at very high speed so the human eye is not perceptible but can be switched on and off at a very high rate thereby riding data, thus creating a mechanism for communication with the people walking or driving under.
5. The level of compute that is enclosed in the tiny space of light bulb or a luminaire in the case of external light, and the presence of high performance computing allows the sensors, sensor hub, communication, security, and gateway functions all combined into one unit. The solution uniqueness also lies in providing high performance capability in a small form factor without compromising the limits or allowable heat envelope without which the intelligent LED bulb apparatus can provide high performance computing while being operational at higher temperatures
6. The intelligent LED bulb apparatus may be configured to only transfer data to the cloud occasionally when a specific condition has occurred or as a regular update after a curtained elapsed time.
7. The intelligent LED bulb apparatus is a unique integration of sensors, sensor processing, computing, communication, and analytics in every bulb in every socket, where each bulb is a self-contained sealed unit.
8. The functionality in any of the described implementations can be achieved through a conglomeration of boards into one or two compact boards or one compact board and eventually into an LED System-on-a-Chip (SoC) with LED Logic+Comprehensive set of sensors+Processing+Communications+Analytics+Data Encryption ensuring security all inside the LED bulb (sealed enclosure)+Mesh Networking creating an End-to-End (E2E) Integration all the way to the backend+true E2E Security+Data Ownership/Brokering+Services.
9. The intelligent LED bulb apparatus is differentiated from the prior art in the comprehensiveness of its solution—that fits into a universal socket, in the size, with no need for electrician to install (anyone can install) for the home/office intelligent LED bulb and having all the functionality in the luminaire allows no external installation, wiring, infrastructure update but simply to take the old Sodium or Mercury vapor or any other HID streetlamps out and putting this intelligent LED streetlight/luminaire in its place with all the functionality of sensors and gateway with communications and analytics capability in one luminaire and reconnecting 110V or 277V wires to the luminaire. There are no gateway boxes mounted on the pole or outside the luminaire. The circuit also senses whether the input voltage is 110V or 277V and still provides the same voltage to the intelligent bulb or luminaire circuitry.

The intelligent LED bulb apparatus coupled with intelligent LED luminaire and other manifestations together may form a foundational platform for service innovation prospects for smart city, smart water, smart metering, emergency and security, smart agriculture, smart retail, smart logistics, smart industrial control, smart animal farming, smart home automation, smart e-health, smart living, smart energy, smart environment, smart building, smart mobility, smart infrastructure, smart healthcare, smart citizens, and smart governance. The smart light does not provides the service innovation prospects as the intelligent LED apparatus does. The difference is others have smart lights and this disclosure indicates intelligent LED apparatus which indicates learning on the go, remembering, analyzing not one but many things mostly in the luminaire itself and that it does comprehensive real time analytics and takes decision in real time at the intelligent LED apparatus level and only temporal or "over a period" post processing is done in the backend. In addition, when an critical situation occurs (e.g. an automobile accident or chemical spill) under a pole, the intelligent LED apparatus can stream video from that pole to any authorized and authenticated location and can also connect directly to emergency service centers (police, disaster management office, American Automotive Association (AAA) tow truck, fire truck, or ambulance). The intelligent LED apparatus can also be supplemented with red LEDs which can pulsate or blink so that the location of the pole under which the disaster took place can easily be location from a distance.

In summary, a framework comprising the intelligent LED bulb apparatuses of the present disclosure as end nodes may include:
1. Sensors: Sensors will be used in all the Internet-Of-Things (IOT) based intelligent LED bulbs or luminairea. The amount of data these sensors would create will be very large especially if it is audio or video data. This data cannot be all sent over the network for processing. There are two reasons. Many of these devices may communicate over the regular communication channels such cellular or WiFi or BLE. The collective bandwidth that will be available and needed for these devices to send the data will be major limiting factor. This would necessitate that the end node sensors be equipped with fair amount of processing so that the data can be analyzed, interpreted, paired down so that the data interpretation happens at the end node and only exceptions or statistical information is passed on to the cloud. Secondly, large percentage of this data does not have information value. For example, a video of a street corner at late night where there is no activity, nothing is changing, nothing exceptional is happening, it would make sense not to send any data to the cloud. Secondly, the sensors are required based on the need and the requirement emanating from the usages. For example, in the downtown of a city where congestion and traffic jams are frequent, sensors like CO, NOx, Sox, particulate matter and so on would be required. At home, sensors like temperature, humidity, smoke, CO and so on would make sense. These sensors can be digital or analog. When analog sensors are used, conversion from analog signal to digital would be required before the data can passed on to controller or a computing unit for analysis (Analog to digital converter (ADC)). The type of sensors used in the invention can change depending on the need. Sensors used at home will have a limited temperature range while sensors that are outside will need to have a larger temperature range. Either in the sensor itself or outside the sensor in a separate area electronic circuitry would be needed to make sure the effect on sensor characteristics due to temperature, humidity, altitude etc. are precisely known. Certain sensors, e.g. electrochemical sensors have a certain life. The module that will used to house the sensors will also be easily removable and replaceable so that the entire disassembly will not be required. Some of the sensors are also self-indicating. For example, sensors used in the intelligent luminaire will also monitor the degradation of the LEDs themselves. This will allow the intelligent LED luminaire itself to indicate to the owner or the city official that it is likely to die and recommend a replacement.

2. Security: A Smart city with a large number of end nodes is likely to be attacked over the network by terrorist or just thrill seekers. Critical infrastructure such as dams, electricity grid, bridges, airports, water supplies etc. which will be on the public network are likely to be attacked. The recent attacks have come from faraway foreign places and can critically affect Smart City infrastructure. This security needs to be protected at four different levels: Secure storage when sensor data is stored, secure in-memory database where the data might be stored in the random access memory or registers, secure communication and secure execution environment. This quadruple security envelope is unique to this implementation of the intelligent LED luminaire. The sensor data thus secured will enable secure analytics/sense-making as well as secure actuation of the critical parts of the infrastructure. Devices need to have to authentication mechanism so that only people or entities that are allowed to have access to those devices are allowed and no one else. This ensures that no one who is not supposed to have access to the devices in the framework is allowed to access and only authorized people have the right kind of access. This mechanism also allows secure patch updates of the operating system, analytics software, new control limits and profiles as well as actuation. It also ensures that when the intelligent LED luminaire or intelligent LED bulb is tampered with or stolen, it is also identified and notification is sent. This ensures both physical as well as logical data security.

3. Fault tolerance/Fail Safe: key infrastructure elements need to be fail-safe in spite of power failures or disasters which necessitates that key infrastructure elements may have a battery-backup so that the sensing would continue in spite of the power failures for a certain length of time. Secondly, critical pieces of infrastructure also need to be built with redundancies to make sure the framework allows the intelligent LED streetlight infrastructure to continue to operate in spite of adverse conditions. Another aspect of this vandalism. In the city environment the framework may allow theft deterrence and when theft does occur, then to able to recover the asset if it is critical, or find a way to decommission the asset so it is excluded from infrastructure thus preventing from wrong data being used in analytics. The very fact that each intelligent LED bulb or luminaire will have its own set of sensors ensures that there will be redundancy. The capacity of the battery power will be decided by the type of usage, expected length of time the device is expected to work without power. This coupled with energy harvesting below can ensure continued operation.

4. Energy Harvesting: Many devices in the Smart city will located at places where 110V connection may not be available. Secondly, having thousands of devices that run from batteries is also not a viable option. This means the end nodes, smart sensors and actuators may be embedded with energy harvesting mechanism which would allow the devices to operate for 10, 15, 20 years without human intervention In the smart city environment framework this will be absolutely be a top requirement. In many Southern states as well cities that between the tropic of Cancer and Capricorn where sunshine is plenty, the framework may allow devices to be running from PV solar cells. During the day luminaire will receive energy from the energy harvester and the excess energy may be stored in batteries. When both are not sufficient especially at night, the 110V or 277V main supply may augment the intelligent LED apparatus.

5. Connectivity: The framework includes provision for slow as well as fast sensors. It is often said that there are more cameras in the City of London than there are people. It is important to have most of the video analytics be done in the luminaire itself, but is conceivable that in some specific cases, a bandwidth would need to be available to be able to stream the data and viewed remotely. For example, when there is no traffic problem, there is nothing to communicate to the cloud but when there is an accident, the connectivity solution may have to allow remote viewing and streaming of video data to the city emergency services. For non-critical cases, and for daily updates the intelligent LED luminaire can use the wireless communication means when bandwidth is comparatively easily available. The outside intelligent LED luminaire will have high bandwidth low duty cycle cellular capability which it can use when critical video of an accident needs to be streamed and sent to the cloud. For other usages, such reading smart meters or communication with devices at home, Z-Wave, ZigBee or any appropriate communication standard capability will be included to address certain usages.

6. Manageability: The number of devices and sensor spread around a smart city will be huge and geographically placed at large distances. The framework allows remote management of these devices which may include remote delivery of operating system (OS) patches, profiles, new analytics algorithms and key management of parameters. For example, a presidential visit to a city may require remote management of traffic lights, so the entourage may pass smoothly through the city. The manageability also includes commissioning and decommissioning and reuse of the intelligent LED luminaires for short term or for long term reasons.

7. Mesh-networked devices: the framework may allow devices to be able to talk with each other without going to the backend, share the data among end nodes, and communicate with other devices in the vicinity for group processing. For example, a specific end node may sense a chemical spill in a one area may interrogate nearby nodes to see if the other nodes are sensing the same. The decision making through combined intelligence of multiple nodes can help in taking better decisions. It also helps in creating a redundancy of sensors if for some reasons the intelligent LED luminaire becomes non-operational.

8. Open APIs for citizens enabling service creation: Cities in general create a large number data sets from a range of devices and sensors. Lot of that data gets stored and never gets analyzed. Since cities are represented by citizens, they like to have a play in the city affairs. The framework may allow citizen access to that common sharable data so they can build applications using the available data and innovate. Utility companies can use the data for planning purpose. For example, knowing accurate information on electricity, water, and gas usages over time can tremendously help utilities in resource planning. Information regarding arrival, departures, level of utilization and loading of a range of transportation means the bus companies can efficiently choose routes. Citizens wanting to go from Point A to point B can walk, bike, take a taxi, car, bus, boat, or train if the data is commonly made available to citizens, they can chose the appropriate method based on their choice and profiles. The intelligent LED Bulb apparatus or the intelligent LED luminaire can thus create a provision service creation by citizens so they can create their applications based on data, the cities can create applications so they can manage the city, the utilities can manage their assets and maintain operation efficiency.

9. Backend or Cloud: This is where statistics get stored and analyzed and post-processed to make sense over time or where aggregate information from many end nodes is used to make macro-decisions. For example, a range of weather data (temperature, pressure, humidity etc.) coming from a large number of end nodes collected over time can help predict micro-climates in a specific area of the city. The temperature data coming from a set of poles in a neighborhood can predict micro-climates. Pressure data emanating from a group of intelligent LED luminaires can possibly predict a likelihood of a tornado developing in that specific area.

10. Communication: Depending on the devices, there might several methods of communication—some may require 3/4G or LTE connectivity, some devices like smart meters or home devices may need Z-Wave or ZigBee, some may require WiFi, BLE, 6LoWPAN depending on the type of sensors and IOT devices used in the framework. Again this communication irrespective of the standard used will be encrypted and will be a secure transmission.

Additionally, apparatuses, methods and storage medium associated with intelligent vents are disclosed herein. The intelligent vents are useful in homes, offices, conference rooms, industrial, retail, and any other similar spaces. Briefly, in embodiments, an intelligent vent may comprise an opening whose cross section can be controlled to control the amount of air that can passed thorough (quantity of air control). Further, the speed of the central HVAC fan may also be controlled so as to provide constant pressure throughout the home (to represent the volume of air that is moved in a given amount of time), thereby eliminating the problems created by back pressure. Still further, the direction of the air flow may be controlled, depending on where the hot or cold spot is, and the air flow is directed in that direction (directional control) to appropriately bring the temperature to the expected set levels.

In embodiments, the vector control (quantity and direction) of the vent may be achieved through integrated actuator control provided by one or more integrated stepper motors in which one stepper motor tilts integrated fins in a specific direction, and the other stepper motor controls the size of the vent opening by controlling the aperture opening under the control of an embedded processor. In embodiments, the temperature and humidity measured at different locations in the room may be communicated to, and used by analytics algorithm running in a controller to decide the vector control, which in turn may be communicated to the embedded processor. In embodiments, intelligent vents, such as floor units, may be powered by a set of AA or other batteries. For other embodiments, intelligent vents, such as ceiling units, may be powered by rechargeable batteries with AC-DC converters.

More specifically, except of the teachings of the present disclosure incorporated therein, the intelligent vent of the present disclosure may be a typical vent that is sometimes housed in the ceiling or sometimes in the floor of a room or in the side wall. Typically, the standard mechanical model, there are one or more fins to direct the flow and amount of hot (or cold as the case may be) air into the room. The fins are fixed but can be manually changed by rotating a small ring on the side which allows the angle to be changed manually. Thus, when the vent fins are manually fixed, it takes a human intervention or manual control to change the amount or direction. In fact, there is not much control over the amount unless the fins are completely closed and hardly any air flows in.

In accordance with one aspect of the present disclosure, these conventional unattractive, manual vents may be turned into a stepper motor controlled fin management unit. In embodiments, at leave two levels of control may be provided, a) the direction of the air and b) the amount of air coming in. The direction of the air may be controlled e.g., by using a stepper motor that turns at regular internal say 0-90 in seven 15 degree steps allowing direction control. In another embodiment, the stepper motor may turn the fins −90 to 90 degrees depending on where in the room the vent is located. The interval through which the stepper motor moves the fins might of finer or coarser than 15 degree. There may be instances where the fins also act like fan oscillating from 0-180 degrees. The other control the intelligent vent may exert is the aperture control which allows the precise control over the cross section of the intelligent vent thereby controlling the amount of air coming in.

The stepper motor may receive its command from a processor that is embedded in the intelligent vent. The intelligent vent may be a 9V unit or powered by 4 AA batteries which allows it to run for period of about a year or so. In embodiments, the intelligent vents may also be configured to call the owner to replace the batteries, when the batteries run low. In alternate embodiments, the intelligent vent may be provided with Bluetooth low energy (BLE), Z-Wave, 6LoWPAN or ZigBee or any other communication blocks to receive commands over a personal area network or WiFi or from a proximately located controller. In embodiments, the proximately located controller may be the Intelligent LED Bulb disclosed herein.

In still other embodiments, the proximately located controller may be an intelligent temperature sensing unit. This allows room by room control of the temperature and humidity thereby creating personalized room comfort. The profile for each room can be learned or set from any units such as desktop, laptop, tablet, or a phone. The unit itself may learn over time the needs of the occupier of the room using learning algorithms.

When the aperture of a vent is reduced, it creates a nozzle effect which means the same amount of air still comes in but at faster rate. In addition, reduced apertures may create a back pressure on the furnace motor as well as the vent pipes. To avoid that, in embodiments, the intelligent vents may also be configured to communicate with the main furnace motor by sending commands to the proximately located controller, e.g., the earlier described intelligent LED light bulb, which in turn communicates main furnace motor to reduce the speed thereby reducing the incoming pressure. Additionally, the aperture size of other intelligent vents in other rooms may be increased to let more air in. This entire system that consists of several intelligent vents with vector controls, each one with direction and amount of air controlled, may work together as a giant automatic feedback control system that pulsates one way or the other based on the needs of each room.

In embodiments, the electronics are built using discrete logic using embedded or any other processor. In other embodiments, the elements and logics may be integrated to form a System-On-Chip (SoC) that does the actuator function, as well as communication with other devices such as other intelligent vents or proximately located controllers, such as intelligent LED Light bulb.

In embodiments, a central controller with control logic may also be provided such that a plan of the home, including the locations of the intelligent vents, the proximately located controllers, such as intelligent LED bulbs or a home server, or other intelligent sensor nodes or sensors hubs may be entered into the central controller. Additionally, individualized preferences for each room, the location/size/capacity of the furnace may also be inputted, to allow the control software to provide particularized control to the intelligent vents, thereby creating individualized room comfort for each occupant in every room.

In the description of example embodiments to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
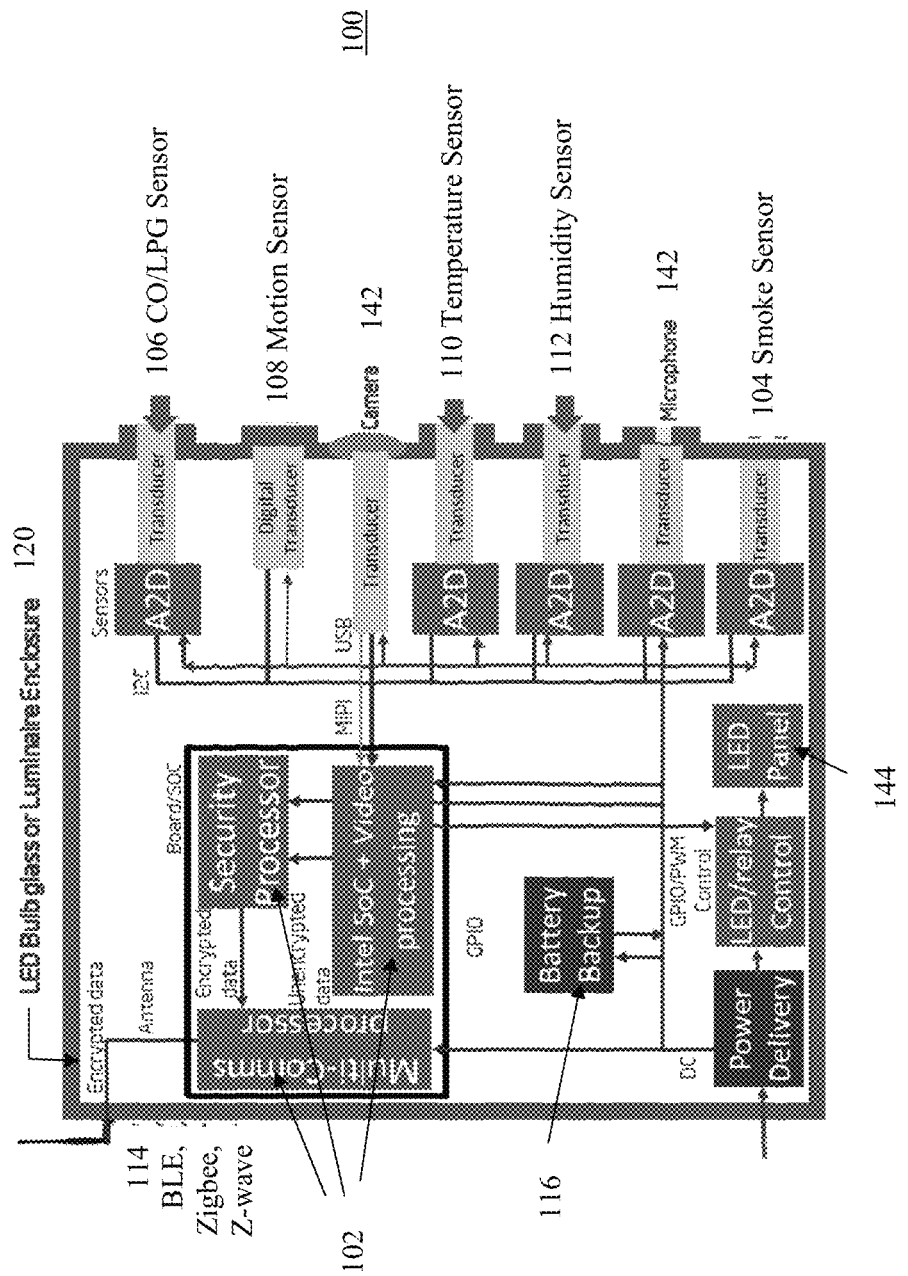
FIG. 2 illustrates an architectural view of the intelligent LED bulb of the present disclosure, in accordance with various embodiments.
Figure 3:
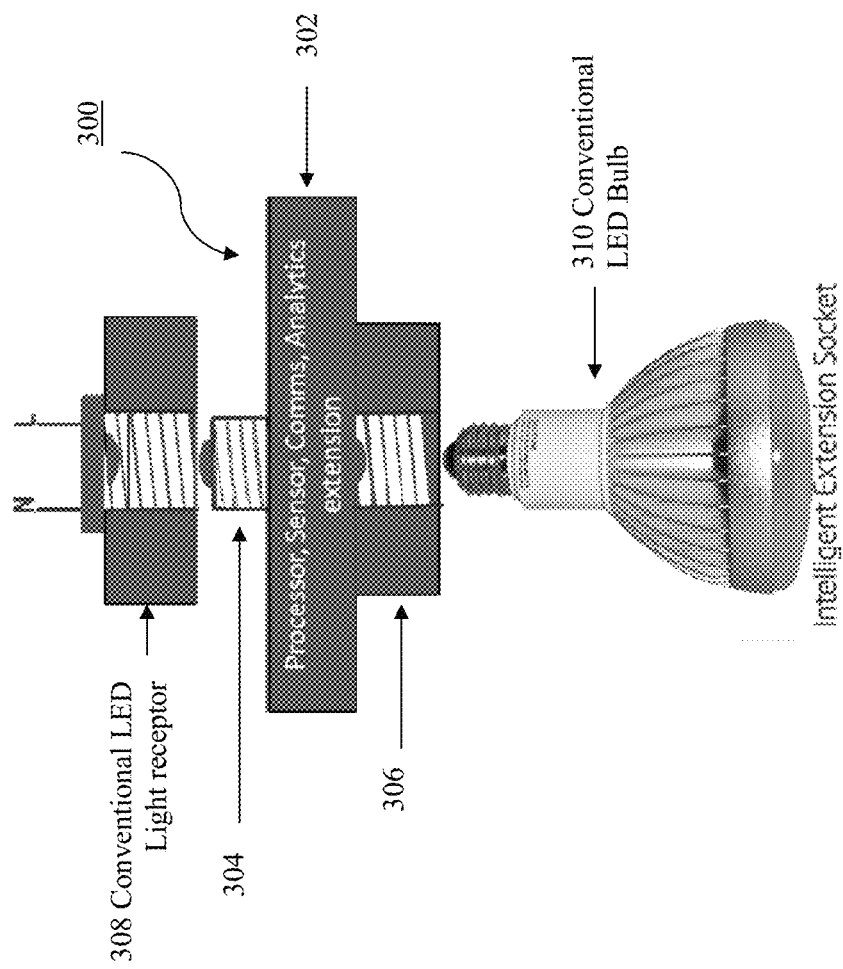
FIG. 3 illustrates an alternative embodiment of the intelligent bulb of the present disclosure, in accordance with various embodiments.

Referring now to FIGS. 1-3, wherein the intelligent LED bulb apparatus of the present disclosure, in accordance with various embodiments, are illustrated. More specifically, FIG. 1 illustrates a perspective view of the intelligent LED bulb apparatus of the present disclosure, in accordance with various embodiments. FIG. 2 illustrates an architectural view of the intelligent LED bulb apparatus of the present disclosure, in accordance with various embodiments. FIG. 3 illustrates an alternate embodiment of the intelligent LED bulb apparatus of the present disclosure, in accordance with various embodiment, As shown in FIG. 1-3, in embodiments, intelligent LED bulb apparatus 100 may include one or more processors 102, sensors 104-112 of various types (such as, smoke, CO, LPG or cooking gas, motion/passive temperature, humidity, and so forth), sensors 140-142 (camera and microphone), short distance communication mechanism 114, such as Bluetooth Low Energy (BLE), Z-Wave, or ZigBee, and rechargeable battery 116, which is charged either directly from a AC-DC power supply, through induction, using a super capacitor, or a replaceable battery. In some embodiments, intelligent LED bulb apparatus 100 may be provided with solar cells to harness solar power to power the unit. In some embodiments, communication mechanism 114 may be configured for short-medium-longer distance communication, such as WiFi, Bluetooth, 6LoWPAN, 3G/4G, LTE and so forth. In some embodiments, intelligent LED bulb apparatus 100 may include additional or alternate sensors for sensing wind, pressure, earth quake, UVA/B, Seismic, particulate matter, certain type of chemicals, biosensors, organic compounds, and so forth.

In embodiments, as shown in FIG. 1, processors 102 and communication mechanism 114 may be enclosed with a LED bulb body 130, with sensors 102-116 and 140-142, and battery 116 disposed thereon. For these embodiments, as shown in FIG. 2, intelligent LED light apparatus 100 may further include LED lights 144. Thus, for these embodiments, intelligent LED light apparatus 100 with LED lights, sensing, processing and communication capabilities, may integrally mate with a conventional LED light receptacle 132, as shown in FIG. 1.

In alternate embodiments, as shown in FIG. 3, processors 102 and communication mechanism 114 may be enclosed with a LED bulb adapter body 302, with sensors 102-116 and 140-142, and battery 116 disposed thereon. For these embodiments, intelligent LED light apparatus 300 would not include LED lights 144. Instead, LED bulb adapter body 302 of intelligent LED light apparatus 300 may include a male connector 304 to mate with a conventional LED light receptacle 308, and a female connector 306 to mate with a conventional LED light bulb 310.

Further, intelligent LED light apparatus 100/300 may be provided with a small real time executive or a kernel (not shown) or a full operating system like Linux. The small real time executive or a kernel, in embodiments, may be configured to go around and poll the sensors 104-112 and/or 140/142 in a round robin fashion, read the sensor data, compare the data with upper and lower control limits, perform initial analytics calculation, make a judgment and/ or pass this data to an external controller, as an input for higher level analytics calculation. For apparatuses running a full operating system, the sensor and higher levels analytics may also be done locally in the apparatus itself. The higher level analytics calculation may be calculated for HVAC, security and/or control of various rooms in a building/ structure, such as a home or an office, and/or various public, commercial, industrial and/or agricultural areas.

Figure 4:
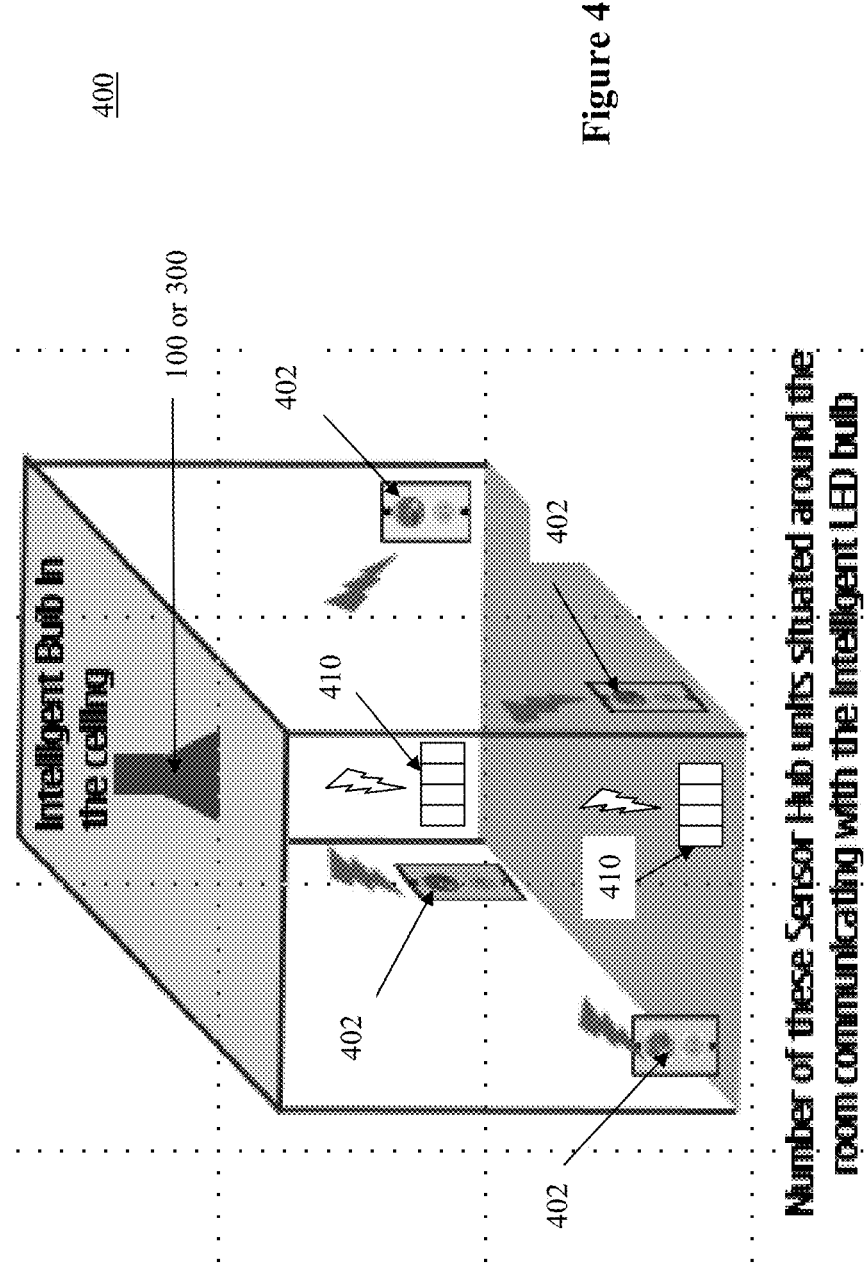
FIG. 4 illustrates an example deployment of the intelligent LED bulb of the present disclosure, in accordance with various embodiments.
Figure 5:
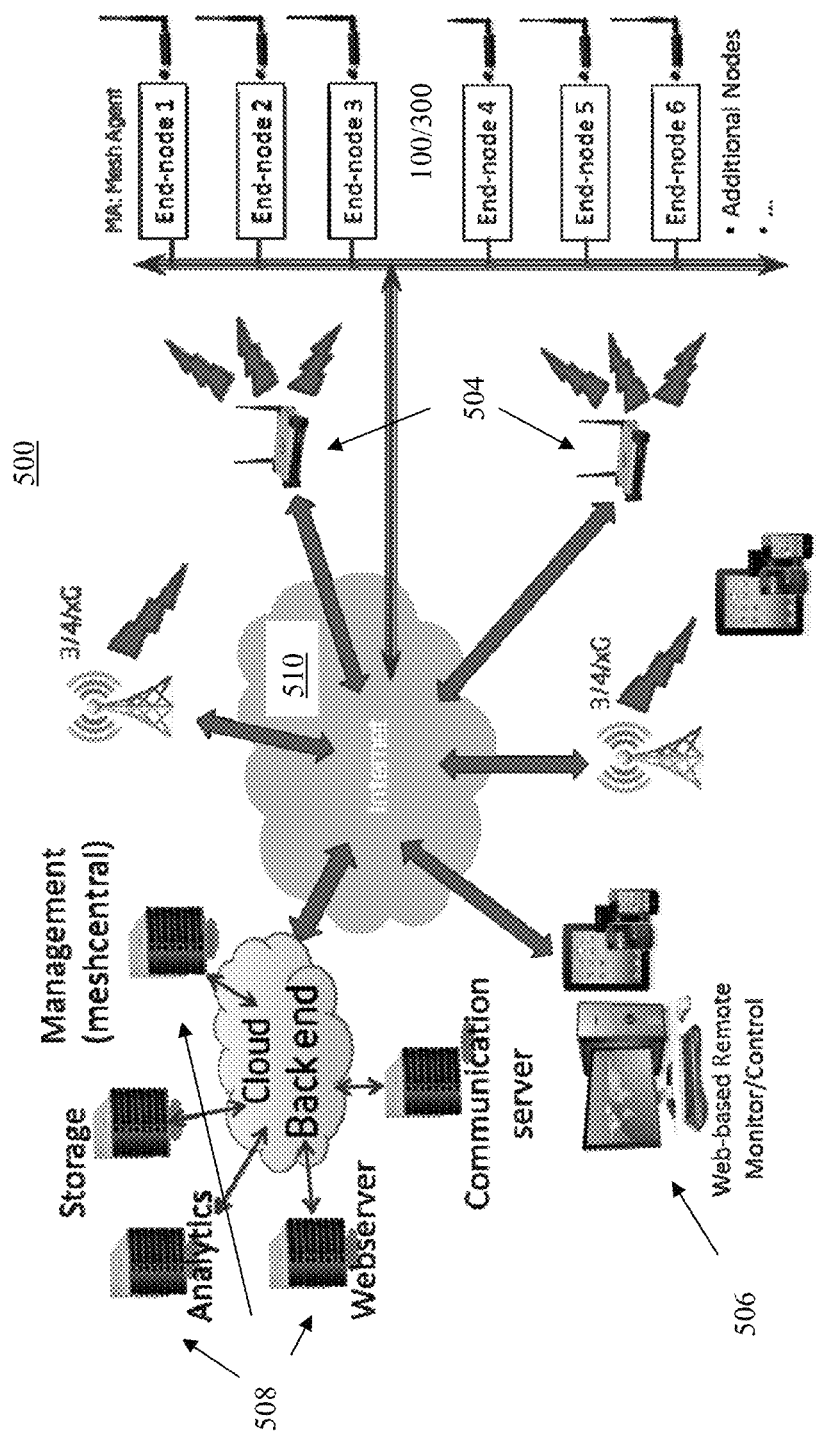
FIG. 5 illustrates a system view of employing the intelligent LED bulbs of the present disclosure for management and control, in accordance with various embodiments

Referring now also to FIGS. 4-5, wherein a couple of examples of deployment of intelligent LED bulb apparatus of the present disclosure, in accordance with various embodiments, are shown. As illustrated in FIG. 5, the remote controller may be a web based monitor/controller 506 or a cloud server 508. Normally the controller 506 is manual control exercised by an operations personnel or an operator sitting in front of a monitor monitoring a certain situation and controlling the end nodes 100/300. For example, the operator from time to time may request a video stream from one of the end nodes 100/300, e.g. if there is an accident under the intelligent LED luminaire or at home it may be a senior person who has fallen and cannot get up. The cloud servers 508 are also controllers but runs completely based on analytics, and data coming various end nodes 100/300. Intelligent LED bulb apparatus 100/300 may communicate with controllers 506/508 via access points 504 and Internet 510. In this case, in addition to the access points, the connection may also be established via a 3/4/xG cellular or some kind of a wired or wireless network. Together, intelligent LED bulb apparatus 100/300, web based monitors/ controllers 506 and/or cloud servers 508 may form a framework for managing homes/offices, public places, retail, commercial, industrial and agricultural areas, cities and/or utilities.

Additionally, as illustrated in FIG. 4, for various applications (e.g., in a home or an office), intelligent LED bulb apparatus 100/300 may serve as a proximately located controller for various sensor hubs 402 disposed at various electrical outlets, or controlling various intelligent vents 410. For example, intelligent LED bulb apparatus 100/300 may be disposed in the ceiling of a room as depicted. Sensor hub 402 is the subject matter of co-pending U.S. non-provisional application, U.S. patent application Ser. No. 14/962,662, entitled SENSOR HUB METHOD AND APPARATUS FOR AN ELECTRICAL OUTLET, contemporaneously filed. In this instance, the intelligent LED bulb apparatus serves as a data collection point for various sensor hubs 402. Intelligent vents 410 will be further described later with references to FIGS. 7-11.

Referring back to FIG. 2, in embodiments, intelligent LED bulb apparatus 100/300 may also be provided with security processors and/or security software to make sure intelligent LED bulb apparatus 100/300 is protected from hacking. The intelligent LED apparatus 100/300 receives data from a range of sensors which is converted into digital data if the sensor is analog and then the digital data is processed internally in the physical enclosures 100/300 for running analytics. So, the enclosures 100/300 themselves provide a first level of physical security. Before this data is transmitted via the external antenna, it is encrypted thereby assuring the integrity of the data going over the wireless antenna. Additionally, the communication mechanism 114, such as BLE, ZigBee, or Z-wave, or 3/4/xG may also be used to download patches, download a new analytics algorithm, update profiles, update the lower and upper control limits, and so forth. The uploads and updates may be initiated from a cell phone, a tablet, a laptop or a desktop PC (not shown) or by an automatic mechanism for a server. The security features such as authentication, authorization and accounting, ensures that the downloads or uploads are from a reliable entity and can be trusted.

Figures 8, 9:
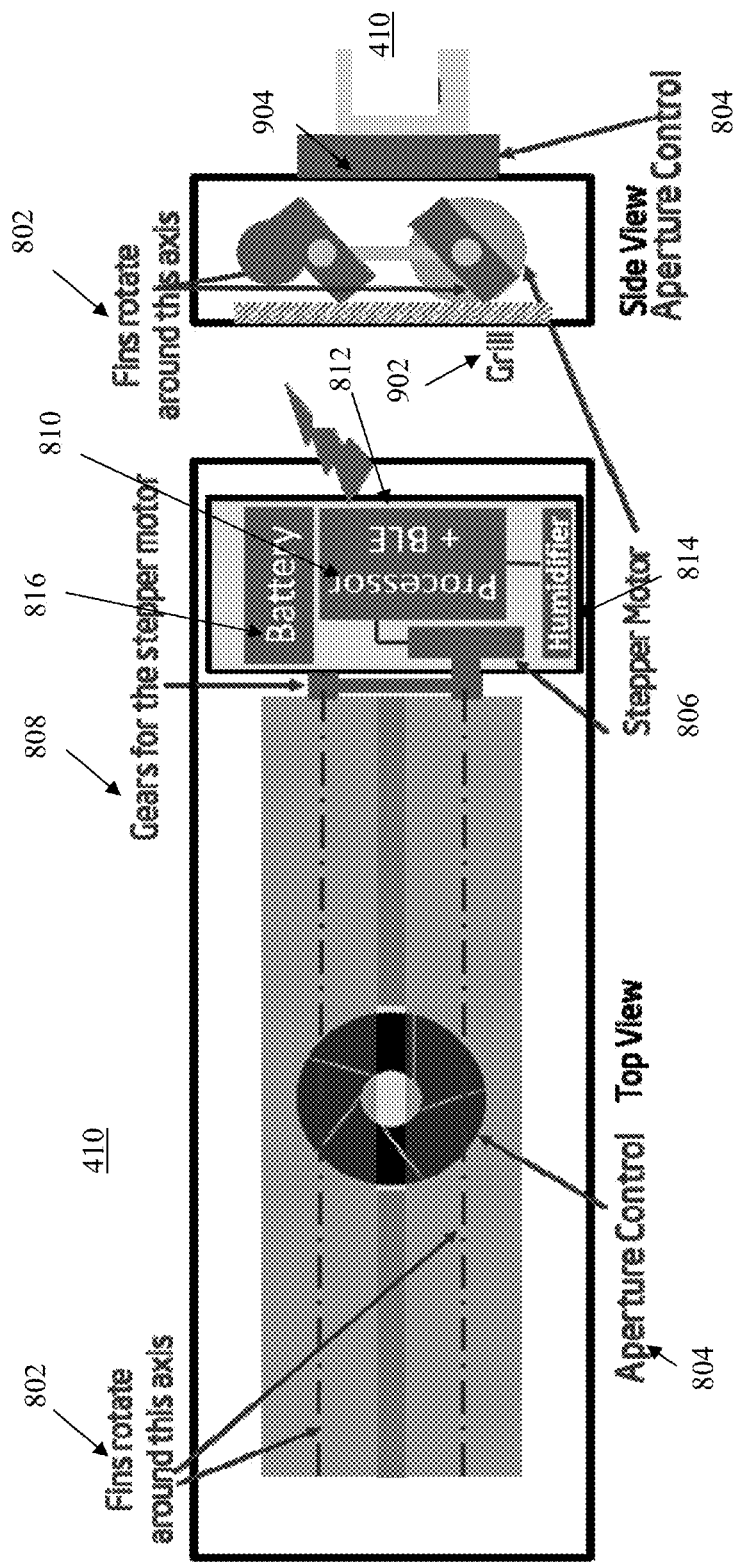
FIG. 8 illustrates a top view of the intelligent vent of the present disclosure, in accordance with various embodiments.
FIG. 9 illustrates a side view of the intelligent vent of the present disclosure, in accordance with various embodiments.

Referring now to FIGS. 8 and 9, wherein a top view and a side view of the intelligent vent of the present disclosure, in accordance with various embodiments, are illustrated.

Figure 10:
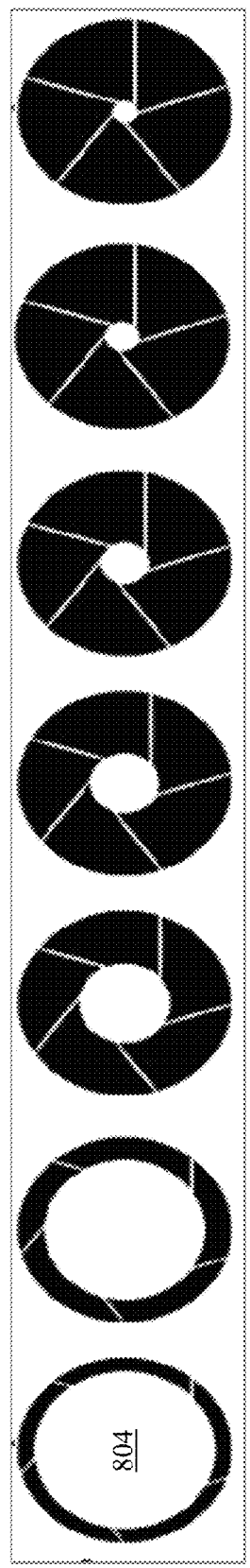
FIG. 10 illustrates aperture control, in accordance with various embodiments
Figure 11:
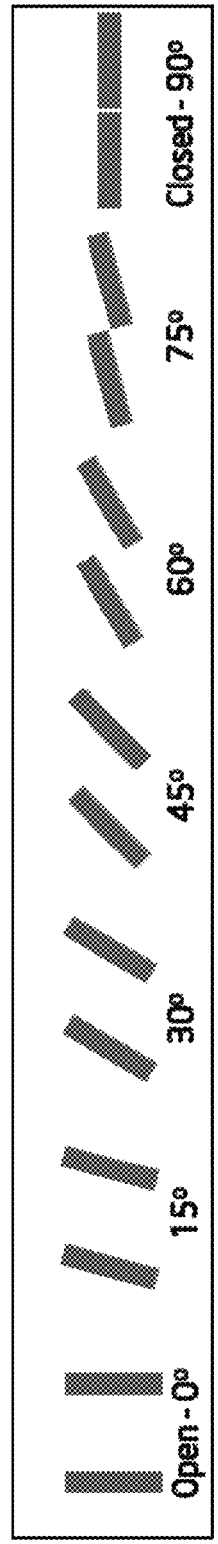
FIG. 11 illustrates fin control, in accordance with various embodiments.

As shown, the intelligent vent 410 may consist of one, two or more fins 802 that are controlled by single stepper motor 806 through a set of gears 808. In another embodiment, there might be two separate stepper motors controlling each fin. The stepper motor 806 may be configured to allow the fin angle to be varied. See FIG. 11, wherein fin direction control, in accordance with various embodiments, is illustrated. In embodiments, the fin angle may be varied between 0-90 degrees, from open to close, as illustrated in FIG. 10 or between −90 to 90 degrees in similar fashion. In embodiments, the fin angle may be varied at some regular intervals, e.g. every 15 degrees. The angle steps might be any number other than 15 degrees Further, the intelligent vent 410 may include aperture control 804 which consists of another stepper motor to allow the precise control over the cross section of the intelligent vent 100 thereby controlling the amount of air coming in. See FIG. 10, wherein aperture control, in accordance with various embodiments, is illustrated. As shown, aperture control 804 may be controlled to provide from a small (minimal) opening (right hand side of FIG. 10) to a full opening (left hand side of FIG. 10). The small (minimal) opening may be referred to a substantially closed opening.

In embodiments, the intelligent vent 410 may be powered by a replaceable or rechargeable battery 816. In embodiments, battery 816 may be 9 v or consists of 4 AA batteries.

In embodiments, the intelligent vent 410 may consist of a small processor for motor control. Examples of suitable processor may be any one of a number of low end processors available from Intel Corporation of Santa Clara, Calif.

In embodiments, the intelligent vent 410 may consist either Bluetooth Low Energy (BLE), Z-Wave, ZigBee, upcoming 6LoWPAN or some other Personal Area Network (PAN) or WiFi connection so it can communicate with a central controller or one or more proximately located controllers, such as the earlier described Intelligent LED. The proximately located controller may direct the stepper control to either change the direction of the fins 802 and therefore the direction of the airflow or increase or decrease the size of the aperture 804 for air volume control.

In embodiments, the intelligent vent 410 may also include one or more sensors 814 (such as humidifier, thermometer, and so forth) to measure various metrics of ambient air. In alternate embodiments, sensors 814 may include one or more of a smoke sensor, a motion sensor, a barometric pressure sensor, a CO sensor, a LPG sensor, a Radon sensor, a Methane sensor or an Ozone sensor. In still other embodiments, sensor 814 may include a camera or a microphone.

In embodiments, to address backpressure resulted from aperture control, the proximately located controller may also be configured to control the main fan speed in the central HVAC system so that a constant pressure is maintained in spite of reducing the aperture 804 thereby preventing the nozzle effect.

Figure 12:
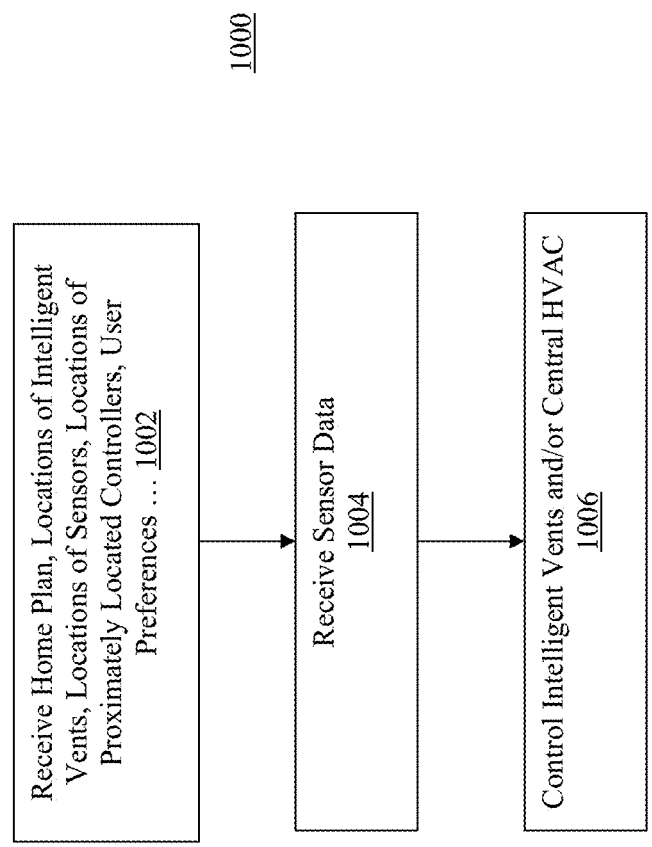
FIG. 12 illustrates an example process flow of HVAC control, in accordance with various embodiments.

Referring now to FIG. 12, wherein an example process flow of HVAC control, in accordance with various embodiments, is illustrated. As shown, process 1000 for HVAC control may include operations at block 1002-1006. Process 1000 may be performed by a central controller, e.g., computer system 600 to be described with references to FIG. 6. In other embodiments, process 1000 may be performed by one or more proximately located controllers, such as earlier described Intelligent LED Bulb or a Home Server.

Process 1000 may start at block 1002. At block 1002, a home plan, locations of intelligent vents, locations of proximately located controllers, locations of sensors, individual room preferences, and so forth may be received, e.g., through inputs entered into a controlling system, or a collection of controllers.

Next at block 1004, various ambient metrics such as temperature, humidity, air quality and so forth of various rooms may be received.

At block 1006, the intelligent vents, and/or central HVAC may be controlled, as described earlier. In particular, the quantity and direction of air flow through the intelligent vents of the various rooms may be controlled, through the control of the fins and apertures of the intelligent vents.

Figure 6:
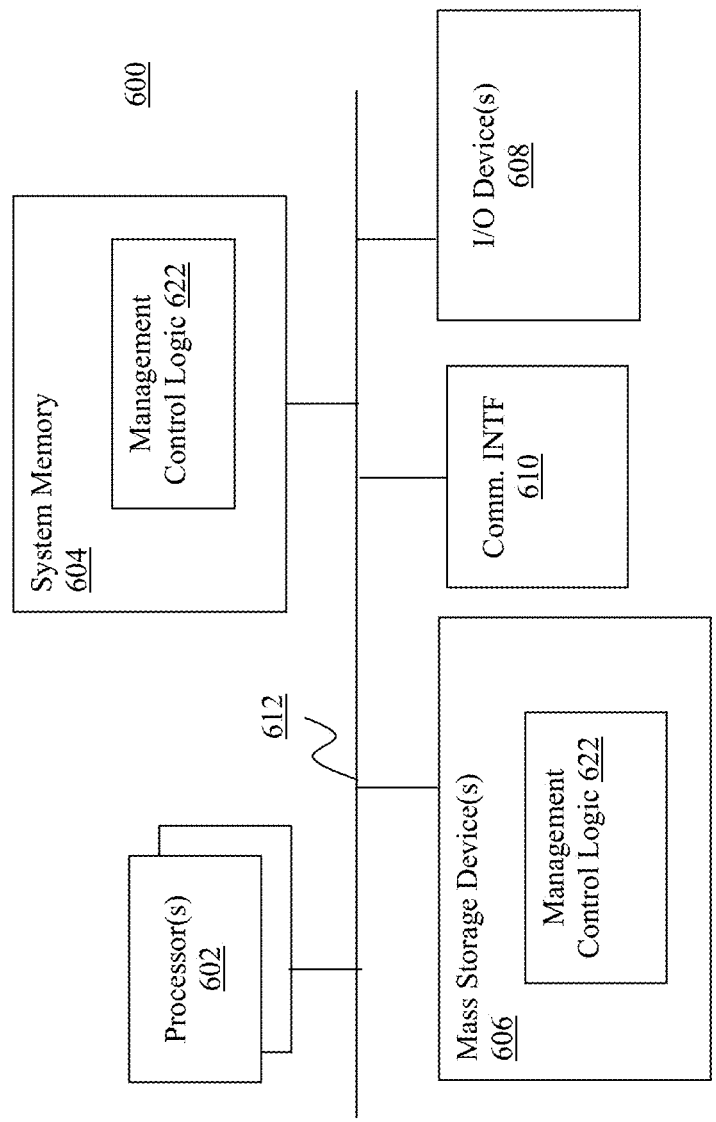
FIG. 6 illustrates a block diagram of an example computer system suitable for use to practice aspects of the present disclosure, in accordance with various embodiments.

Referring now to FIG. 6, wherein a block diagram of an example computer system, suitable for use to practice the remote controller aspect of the present disclosure, in accordance with various embodiments, is illustrated. As shown, computer system 600 may include one or more processors or processor cores 602, and system memory 604. In embodiments, multiples processor cores 602 may be disposed on one die. For the purpose of this application, including the claims, the terms "processor" and "processor cores" may be considered synonymous, unless the context clearly requires otherwise. Additionally, computer system 600 may include mass storage device(s) 606 (such as solid state drives), input/output device(s) 608 (such as display, and so forth) and communication interfaces 610 (such as network interface cards, modems and so forth). In embodiments, the display may be touch sensitive. In embodiments, communication interfaces 610 may support wired or wireless communication, including near field communication. The elements may be coupled to each other via system bus 612, which may represent one or more buses such as I²C, GPIO, USB. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the programming instructions implementing various monitoring, analysis, reporting, and/or control operations, collectively denoted as management control logic 622. The various elements may be implemented by assembler instructions supported by processor(s) 602 or high-level languages, such as, for example, C, or Java that can be compiled into such instructions.

The permanent copy of the programming instructions may be placed into permanent mass storage device(s) 606 in the factory, or in the field, through, for example, a distribution medium (not shown), such as a compact disc (CD), or through communication interface 610 (from a distribution server (not shown)).

The number, capability and/or capacity of these elements 610-612 may vary, depending on whether example computer system 600 is a smartphone, a tablet, a Ultrabook, a laptop, a desktop, or a server. The constitutions of these elements 610-612 are otherwise known, and accordingly will not be further described.

Figure 7:
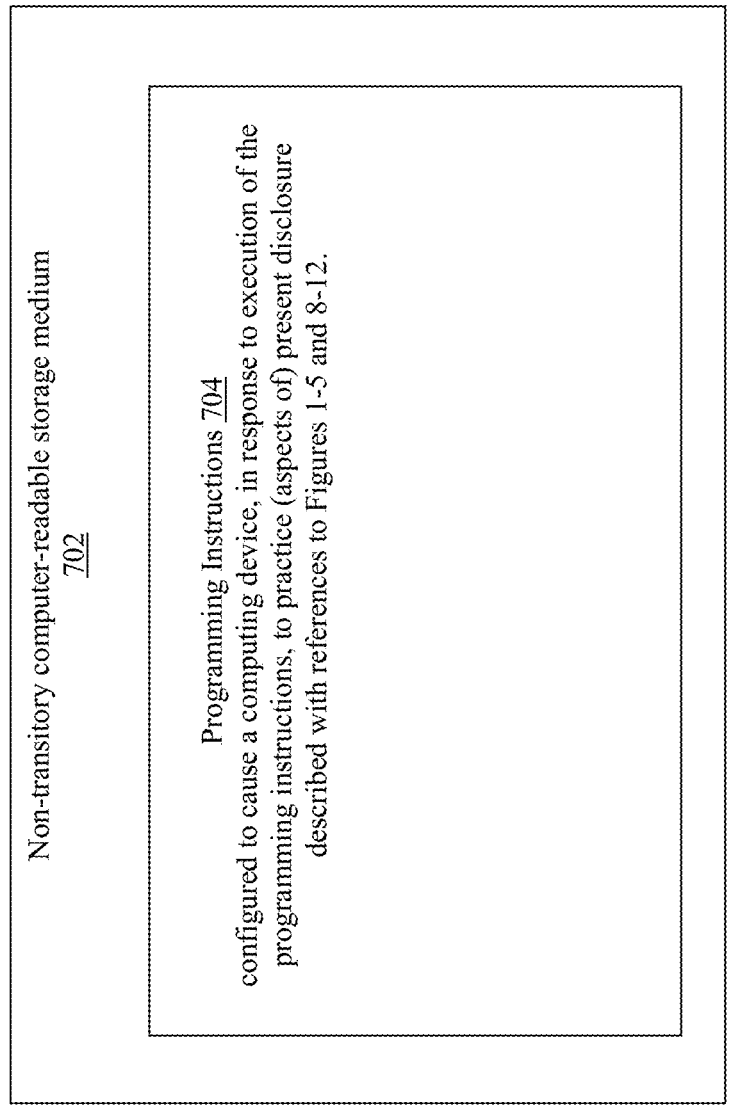
FIG. 7 illustrates an example computer-readable storage medium with instructions configured to enable a computer system to practice aspects of the present disclosure, in accordance with various embodiments.

FIG. 7 illustrates an example non-transitory computer-readable storage medium having instructions configured to practice all or selected ones of the monitoring, control and/or analysis operations, earlier described, in accordance with various embodiments. As illustrated, non-transitory computer-readable storage medium 702 may include a number of programming instructions 704. Programming instructions 704 may be configured to enable a device, e.g., computer system 600, in response to execution of the programming instructions, to perform, e.g., various monitoring, analysis, reporting and/or control operations. In alternate embodiments, programming instructions 704 may be disposed on multiple non-transitory computer-readable storage media 702 instead. In still other embodiments, programming instructions 704 may be encoded in transitory computer readable signals.

Referring back to FIG. 6, for one embodiment, at least one of processors 602 may be packaged together with a computer-readable storage medium having management control logic 622 (in lieu of storing in system memory 604 and/or mass storage device 606) configured to practice all or selected aspects of monitoring, analysis, reporting and/or control operations. For one embodiment, at least one of processors 602 may be packaged together with a computer-readable storage medium having management control logic 622 to form a System in Package (SiP). For one embodiment, at least one of processors 602 may be integrated on the same die with a computer-readable storage medium having management control logic 622. For one embodiment, at least one of processors 602 may be packaged together with a computer-readable storage medium having management control logic 622 to form a System on Chip (SoC). For at least one embodiment, the SoC may be utilized in, e.g., but not limited to, a hybrid computing tablet/laptop.

Example 1 may be an intelligent light emitting diode (LED) bulb apparatus, comprising: a communication interface; a processor coupled to the communication interface; a body that encases at least the communication interface and the processor, and having a male connector to mate with a bulb receptor; first one or more sensors disposed on the body; and a plurality of LED lights disposed on the body, or a female connector disposed on the body to receive the plurality of LED lights. The processor may receive first sensor data sensed by the first one or more sensors or second sensor data sensed by second plurality of sensors disposed at a plurality of proximately located sensor hubs, process the first or second sensor data, and transmit the first or second sensor data or results from the processing of the first or second sensor data to an external recipient.

Example 2 may be example 1, wherein the intelligent LED bulb apparatus may comprise the LED lights disposed on the body.

Example 3 may be example claim 1, wherein the body may include the female connector disposed on the body to receive the plurality of LED lights.

Example 4 may be example 1, wherein the first one or more sensors or the second plurality of sensors may comprise one or more of a smoke sensor, a motion sensor, a temperature sensor, a humidity sensor, or a barometric pressure sensor.

Example 5 may be example 1, wherein the first one or more sensors or the second plurality of sensors may comprise one or more of a CO sensor, a LPG sensor, a Radon sensor, a Methane sensor or an Ozone sensor.

Example 6 may be example 1, wherein the first one or more sensors or the second plurality of sensors may comprise at least a selected one of a camera or a microphone.

Example 7 may be example 1, wherein the communication interface may be selected from a group consisting of Bluetooth Low Energy, Z-wave and ZigBee communication interfaces.

Example 8 may be example 1, wherein the communication interface may be selected from a group consisting of WiFi, 3G/4G or Long Term Evolution (LTE) communication interfaces.

Example 9 may be example 1, further comprising a transformer to step down voltages for the processor or the communication interface.

Example 10 may be example 1, further comprising a battery to provide backup power when no power is supplied through the male connector.

Example 11 may be example 1, wherein at least one of the proximally located sensor hubs may be another intelligent LED bulb having third one or more sensors of one or more sensor types.

Example 12 may be example 1, wherein at least one of the proximally located sensor hubs may be a sensor hub having third plurality of sensors of a plurality of sensor types, disposed at and coupled with an electrical outlet.

Example 13 may be example 1, wherein at least one of the proximally located sensor hubs may be an intelligent vent having third plurality of sensors of a plurality of sensor types.

Example 14 may be example 1, wherein the external recipient may be a remotely disposed management console or a cloud computing server.

Example 15 may be any one of examples 1-11, wherein the male connector may mate the intelligent LED bulb to a bulb receptor disposed at a lamp post.

Example 16 may be any one of examples 1-14, wherein the male connector may mate the intelligent LED bulb to a bulb receptor disposed in a room.

Example 17 may be any one of examples 1-14, wherein the intelligent LED bulb may be an Internet-of-Thing having an associated Internet Protocol (IP) address.

Example 18 may be a method for providing light and collecting sensor data, comprising providing light, by an intelligent light emitting diode (LED) bulb apparatus with a plurality of LED lights disposed thereon or mated with the intelligent LED bulb apparatus; sensing, with first one or more sensors disposed on the intelligent LED bulb apparatus or second plurality of sensors disposed at a plurality proximally located sensor hubs, a plurality of environment data; and selectively processing or transmitting, by the intelligent LED bulb apparatus, the environment data or processing results of the environmental data to an external recipient.

Example 19 may be example 18, wherein providing light may comprise providing light with the plurality of LED lights disposed on the LED bulb apparatus.

Example 20 may be example 18, further comprising receiving, with a female connector of the intelligent LED bulb apparatus, the plurality of LED lights.

Example 21 may be example 18, wherein sensing may comprise sensing with first one or more sensors or second plurality of sensors disposed at second proximally located sensor hubs that are selected from a group comprising one or more of a smoke sensor, a motion sensor, a temperature sensor, a humidity sensor, or a barometric pressure sensor.

Example 22 may be example 18, wherein sensing may comprise sensing with first one or more sensors or second plurality of sensors disposed at second proximally located sensor hubs that are selected from a group comprising one or more of a CO sensor, a LPG sensor, a Radon sensor, a Methane sensor or an Ozone sensor.

Example 23 may be example 18, wherein sensing may comprise sensing with first one or more sensors or second plurality of sensors disposed at second proximally located sensor hubs that include a camera or a microphone.

Example 24 may be example 18, wherein transmitting may comprise transmitting via a communication protocol that is selected from a group consisting of Bluetooth Low Energy, Z-wave and ZigBee communication protocol.

Example 25 may be example 18, wherein transmitting may comprise transmitting via a communication protocol that is selected from a group consisting of WiFi, 3G/4G or Long Term Evolution (LTE) communication protocol.

Example 26 may be example 18, further comprising stepping down voltages for a processor or a communication interface of the intelligent LED bulb apparatus.

Example 27 may be example 18, further comprising providing backup power with a battery disposed in the intelligent LED bulb apparatus, when no power is supplied to the intelligent LED bulb apparatus.

Example 28 may be example 18, wherein at least one of the proximally located sensor hubs is another intelligent LED bulb apparatus having third one or more sensors of one or more sensor types, and wherein the method further may comprise receiving the sensed data from the another intelligent LED bulb apparatus.

Example 29 may be example 18, wherein at least one of the proximally located sensor hubs is a sensor hub having third plurality of sensors of a plurality of sensor types, disposed at and coupled with an electrical outlet, and wherein the method further may comprise receiving the sensed data from the sensor hub disposed at and coupled with an electrical outlet.

Example 30 may be example 18, wherein at least one of the proximally located sensor hubs is an intelligent vent having third plurality of sensors of a plurality of sensor types, and wherein the method further may comprise receiving the sensed data from the intelligent vent; and wherein transmitting may comprise transmitting to a remotely disposed management console or a cloud computing server.

Example 31 may be any one of the examples 18-28, further comprising mating the intelligent LED bulb apparatus to a bulb receptor disposed at a lamp post, or to a bulb receptor disposed in a room.

Example 32 may be any one of the examples 18-30, wherein the intelligent LED bulb apparatus is an Internet-of-Thing having an associated Internet Protocol (IP) address, and wherein selectively transmitting may comprise selectively transmitting in accordance with a Transmission Control Protocol/Internet Protocol.

Example 33 may be an intelligent vent apparatus, comprising: a plurality of moveable fins; an aperture having a variable opening; and a stepper motor coupled with the plurality of fins and the aperture to control angles of the fins, and an amount of opening of the aperture.

Example 34 may be example 33, wherein the stepper motor may control angles of the fins between 0-90 degrees or −90 to 90 degrees.

Example 35 may be example 33, wherein the stepper motor may control the amount of opening of the aperture between a full open position and a substantially closed position.

Example 36 may be example 33, further comprising a processor coupled with the stepper motor to control operation of the stepper motor.

Example 37 may be example 36, wherein the processor may further communicate with an external heating, ventilation, air-conditioning (HVAC) system.

Example 38 may be example 37, further comprising a communication interface selected from a group consisting of Bluetooth Low Energy, Z-wave, ZigBee 6LoWPAN and WiFi communication interface.

Example 39 may be example 33 further comprising one or more sensors selected from a group consisting of a temperature sensor, a humidity sensor, a motion sensor, a barometric pressure sensor, a CO sensor, a LPG sensor, a Radon sensor, a Methane sensor or an Ozone sensor, a camera and a microphone.

Example 40 may be a method for controlling ventilation, comprising: receiving, by one or more controllers, locations of intelligent vents, and HVAC preferences for one or more rooms where the intelligent vents are located; and respectively controlling, by the one or more controllers, proximally located ones of the intelligent vents, based at least in part on the HVAC preferences.

Example 41 may be example 40, wherein at least one of the intelligent vents may comprise a plurality of moveable fins, wherein controlling the at least one of the intelligent vents may comprise controlling angles of the fins between 0-90 degrees or −90 to 90 degrees.

Example 42 may be example 40, wherein at least one of the intelligent vents may comprise an aperture with a variable opening, wherein controlling the at least one of the intelligent vents may comprise controlling an amount of opening of the aperture between a full open position and a substantially closed position.

Example 43 may be example 40, wherein at least one of the one or more controllers is an intelligent light emitting diode (LED) bulb apparatus located in a room, wherein receiving may comprise receiving, by the intelligent LED bulb apparatus, sensor data from sensors co-located within the same room, wherein controlling may comprise controlling intelligent vents co-located within the same room, and wherein controlling the intelligent vents co-located within the same room is further based on the sensor data received.

Example 44 may be example 43, wherein the sensors may comprise a plurality of sensors integrally disposed with the intelligent LED bulb apparatus, and wherein receiving sensor data may comprise receiving sensor data from the integrally disposed sensors.

Example 45 may be example 43, wherein the sensors may comprise a plurality of sensors integrally disposed with a plurality of sensor hubs disposed at a plurality of electrical outlets of the room, and wherein receiving sensor data may comprise receiving sensor data from the sensors integrally disposed with the sensor hubs disposed at the plurality of electrical outlets of the room.

Example 46 may be example 43, wherein the sensors may comprise a plurality of sensors integrally disposed with the intelligent vents, and wherein receiving sensor data may comprise receiving sensor data from the sensors integrally disposed with the intelligent vents of the room.

Example 47 may be at least one computer-readable storage medium comprising a plurality of instructions configured to cause an intelligent light emitting diode (LED) bulb, in response to execution of the instructions by the intelligent LED bulb, to perform any one of the methods of examples 18-32.

Example 48 may be an intelligent light emitting diode (LED) bulb apparatus for collecting sensor data, comprising means for performing any one of the methods of examples 18-32.

Example 49 may be at least one computer-readable storage medium comprising a plurality of instructions configured to cause an apparatus, in response to execution of the instructions by the apparatus, to perform any one of the methods of examples 40-46.

Example 50 may be an apparatus for collecting sensor data, comprising means for performing any one of the methods of examples 40-46.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An intelligent light emitting diode (LED) bulb apparatus, comprising:
   a communication interface;
   a processor coupled to the communication interface;
   a body that encases at least the communication interface and the processor, and having a male connector to mate with a bulb receptor;
   first plurality of sensors disposed on the body; and
   a plurality of LED lights disposed on the body, or a female connector disposed on the body to receive the plurality of LED lights;
   wherein the processor is to receive first sensor data sensed by the first plurality of sensors and second sensor data sensed by a second plurality of sensors disposed at a plurality of proximally located sensor hubs, process the first and second sensor data, and transmit the first and second sensor data or results from the processing of the first and second sensor data to a recipient external to the intelligent LED bulb apparatus.

2. The intelligent LED bulb apparatus of claim 1, wherein the intelligent LED bulb apparatus comprises the LED lights disposed on the body.

3. The intelligent LED bulb apparatus of claim 1, wherein the body includes the female connector disposed on the body to receive an LED bulb having the plurality of LED lights.

4. The intelligent LED bulb apparatus of claim 1, wherein the first plurality of sensors or the second plurality of sensors comprise one or more of a smoke sensor, a motion sensor, a temperature sensor, a humidity sensor, or a barometric pressure sensor.

5. The intelligent LED bulb apparatus of claim 1, wherein the first plurality of sensors or the second plurality of sensors comprise one or more of a CO sensor, an LPG sensor, a radon sensor, a methane sensor or an ozone sensor.

6. The intelligent LED bulb apparatus of claim 1, wherein the first plurality of sensors or the second plurality of sensors comprises at least a selected one of a camera or a microphone.

7. The intelligent LED bulb apparatus of claim 1, wherein the communication interface is selected from a group consisting of Bluetooth Low Energy, Z-wave and ZigBee communication interfaces.

8. The intelligent LED bulb apparatus of claim 1, wherein the communication interface is selected from a group consisting of WiFi, 3G/4G or Long Term Evolution (LTE) communication interfaces.

9. The intelligent LED bulb apparatus of claim 1, further comprising a transformer to step down voltages for the processor or the communication interface.

10. The intelligent LED bulb apparatus of claim 1, further comprising a battery to provide backup power when no power is supplied through the male connector.

11. The intelligent LED bulb apparatus of claim 1, wherein at least one of the proximally located sensor hubs is another intelligent LED bulb having some of the second plurality of sensors.

12. The intelligent LED bulb apparatus of claim 1, wherein at least one of the proximally located sensor hubs is a sensor hub having some of the second plurality of sensors, disposed at and coupled with an electrical outlet.

13. The intelligent LED bulb apparatus of claim 1, wherein at least one of the proximally located sensor hubs is an intelligent vent having some of the second plurality of sensors.

14. The intelligent LED bulb apparatus of claim 1, wherein the recipient external to the intelligent LED bulb apparatus is a remotely disposed management console or a cloud computing server.

15. The intelligent LED bulb apparatus of claim 1, wherein the male connector is to mate the intelligent LED bulb to a bulb receptor disposed at a street lamp post.

16. The intelligent LED bulb apparatus of claim 1, wherein the male connector is to mate the intelligent LED bulb to a bulb receptor disposed in a room.

17. The intelligent LED bulb apparatus of claim 1, wherein the intelligent LED bulb is an Internet-of-Thing having an associated Internet Protocol (IP) address.

18. A method for providing light and collecting sensor data, comprising:
provide light, by an intelligent light emitting diode (LED) bulb apparatus with a plurality of LED lights disposed thereon or mated with the intelligent LED bulb apparatus;
sensing, with a first plurality of sensors disposed on the intelligent LED bulb apparatus and a second plurality of sensors disposed at a plurality of proximally located sensor hubs, a plurality of environment data; and
selectively processing or transmitting, by the intelligent LED bulb apparatus, the environment data or processing results of the environment data to a recipient external to the intelligent LED bulb apparatus.

19. The method of claim 18, wherein providing light comprises providing light with the plurality of LED lights disposed on the LED bulb apparatus.

20. The method of claim 18, further comprising receiving, with a female connector of the intelligent LED bulb apparatus, an LED bulb having the plurality of LED lights.

21. The method of claim 18, wherein the method further comprises receiving some of the environment data sensed by some of the second plurality of sensors disposed on another intelligent LED bulb apparatus.

22. The method of claim 18, wherein the method further comprises receiving some of the environment data sensed by some of the second plurality of sensors disposed on a sensor hub disposed at and coupled with an electrical outlet.

23. The method of claim 18, wherein the method further comprises receiving some of the environment data sensed by some of the second plurality of sensors disposed on an intelligent vent.

24. At least one computer-readable storage medium comprising a plurality of instructions configured to cause an intelligent light emitting diode (LED) bulb, in response to execution of the instructions by the intelligent LED bulb, to
read from a first plurality of sensors integrated with the intelligent LED bulb and a second plurality of sensors of a plurality of proximally disposed sensor hubs, a plurality of environment data; and
selectively process or transmit the environment data read or results of the processing to a recipient external to the intelligent LED bulb;
wherein the intelligent LED bulb comprises:
a communication interface;
a processor coupled to the communication interface;
a body that encases at least the communication interface and the processor, and having a male connector to mate with a bulb receptor;
first plurality of sensors disposed on the body; and
a plurality of LED lights disposed on the body, or a female connector disposed on the body to receive the plurality of LED lights.

25. The at least one computer-readable storage medium of claim 24, wherein the body includes the female connector disposed on the body to receive an LED bulb having the plurality of LED lights.

* * * * *

UNITED STATES PATENT AND TRADEMARK OFFICE
CERTIFICATE OF CORRECTION

PATENT NO. : 9,661,713 B2  
APPLICATION NO. : 14/962669  
DATED : May 23, 2017  
INVENTOR(S) : Sandhiprakash J. Bhide Page 1 of 1

It is certified that error appears in the above-identified patent and that said Letters Patent is hereby corrected as shown below:

Column 22:  
Line 43, "first plurality..." should read - ...a first plurality...

Column 24:  
Line 43, "first plurality..." should read - ...the first plurality...

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*